United States Patent
Kaneko

Patent Number: 5,673,895
Date of Patent: Oct. 7, 1997

[54] BUTTERFLY VALVE

[75] Inventor: Masahiro Kaneko, Higashimatsuyama, Japan

[73] Assignee: Jidosha Kiki Co., Ltd., Tokyo, Japan

[21] Appl. No.: 536,072

[22] Filed: Sep. 29, 1995

Related U.S. Application Data

[63] Continuation of Ser. No. 348,741, Nov. 30, 1994, abandoned, which is a continuation of Ser. No. 187,755, Jan. 27, 1994, abandoned.

[30] Foreign Application Priority Data

Jan. 27, 1993 [JP] Japan .................. 5-001727 U

[51] Int. Cl.[6] ........................... F16K 1/22
[52] U.S. Cl. ...................... 251/306; 251/305
[58] Field of Search ......................... 251/305, 306

[56] References Cited

U.S. PATENT DOCUMENTS

| | | | |
|---|---|---|---|
| 3,363,645 | 1/1968 | Miller | 251/306 X |
| 3,475,007 | 10/1969 | Fawkes | 251/305 |
| 4,022,424 | 5/1977 | Davis et al. | 251/305 X |
| 4,037,819 | 7/1977 | Kindersley | 251/305 X |
| 4,273,308 | 6/1981 | Nakai | 251/305 X |
| 4,335,738 | 6/1982 | Nassir | 251/306 X |
| 4,938,452 | 7/1990 | Imamura et al. | 251/305 |

FOREIGN PATENT DOCUMENTS

| | | | |
|---|---|---|---|
| 1284206 | 2/1969 | Germany | 251/305 |
| 54-90523 | 12/1979 | Japan . | |

*Primary Examiner*—John Fox
*Attorney, Agent, or Firm*—Fish & Richardson P.C.

[57] ABSTRACT

A butterfly valve of the present invention comprises holes formed in the side wall of a housing having a fluid passage, bushings pressed into the holes, a shaft of valve body inserted into the bushings to rotatably support the valve body, a step surface facing the upper stream which is formed at a substantially semi-circular portion on the peripheral wall of the fluid passage, and a step surface facing the lower stream which is formed at another substantially semi-circular portion thereon, the peripheral end surfaces of the valve disc being brought into contact with the step surfaces, wherein the shaft is arranged by being offset to the downstream side with respect to the valve disc.

1 Claim, 3 Drawing Sheets

BUTTERFLY VALVE

This application is a continuation of application Ser. No. 08/348,741, filed Nov. 30, 1994 now abandoned, which is a continuation of application Ser. No. 08/187,755, filed Jan. 27, 1994 now abandoned.

FIELD OF THE INVENTION AND RELATED ART STATEMENT

The present invention relates to a butterfly valve and, more particularly the seal construction of the bearing thereof.

Exhaust brake valves and particulate valves must shut off high-pressure exhaust gas.

Conventionally, as disclosed in Japanese Utility Model Provisional Publication No. SHO 54-90523/1979, the upstream-side fluid passage a and the downstream-side fluid passage b are formed by being offset vertically, and a step surface c facing upper stream and a step surface d facing lower stream are formed at the peripheral wall at the place where both fluid passages meet, so that the peripheral end surfaces of a valve disc e come in contact with the step surfaces, as shown in FIG. 4. With this construction, the surface contact of the valve disc e with the step surfaces c and d increases sealing effect and surely accommodates the valve disc e against the pressure of exhaust gas.

In such a type of valve, a hole g for supporting a shaft f of the valve disc e must be formed at the place where the upstream-side fluid passage a and the downstream-side fluid passage b meet, namely the place where steps are formed, as shown in FIGS. 5 and 6.

If a hole is formed at the place where steps are formed as described above, uniform force does not act on a tool, so that it is difficult to machine the valve, and the machining accuracy is decreased. Also, perfect sealing effect cannot be expected because the step surfaces at the places indicated by reference character h in FIG. 5 are cut off.

OBJECT AND SUMMARY OF THE INVENTION

Accordingly, an object of the present invention is to provide a butterfly valve which increases its sealing effect.

The butterfly valve of the present invention comprises holes formed in the side wall of a housing having a fluid passage, bushings pressed into the holes, a shaft of valve body inserted into said bushes to rotatably support the valve body, a step surface facing the upper stream which is formed at a substantially semi-circular portion on the peripheral wall of the fluid passage, and a step surface facing the lower stream which is formed at another substantially semi-circular portion thereon, the peripheral end surfaces of the valve disc being brought into contact with the step surfaces, in which the shaft is offset to the downstream side with respect to the valve disc.

In this butterfly valve, the holes for supporting the shaft can be formed in the fluid passage on the downstream side because the bearing portion is positioned on the downstream side of the valve disc when the valve is closed. Therefore, machining is easy and the machining accuracy is increased. Further, high-pressure exhaust gas does not act on the bearing portion.

Further, in the butterfly valve of the present invention, inward flanges are formed at the end on the side of the fluid passage of the holes and the inside peripheral surface of said flange is positioned close to the shaft to form an orifice between the flange and the shaft, and the bushings is positioned with a space from the end surface of the flange to form an expansion chamber between the bushings and the flange.

In this butterfly valve, the fluid in the fluid passage leaks to the outside through the first orifice formed between the flange and the shaft, the expansion chamber, and the second orifice formed between the bushings and the shaft in the fluid leakage passage of the bearing portion. Therefore, the fluid, when leaking to the outside, is subjected to friction loss at the first orifice, sudden expansion loss and sudden contraction loss at the expansion chamber, and friction loss at the second orifice.

DETAILED DESCRIPTION OF PREFERRED EMBODIMENTS

Figure 1:
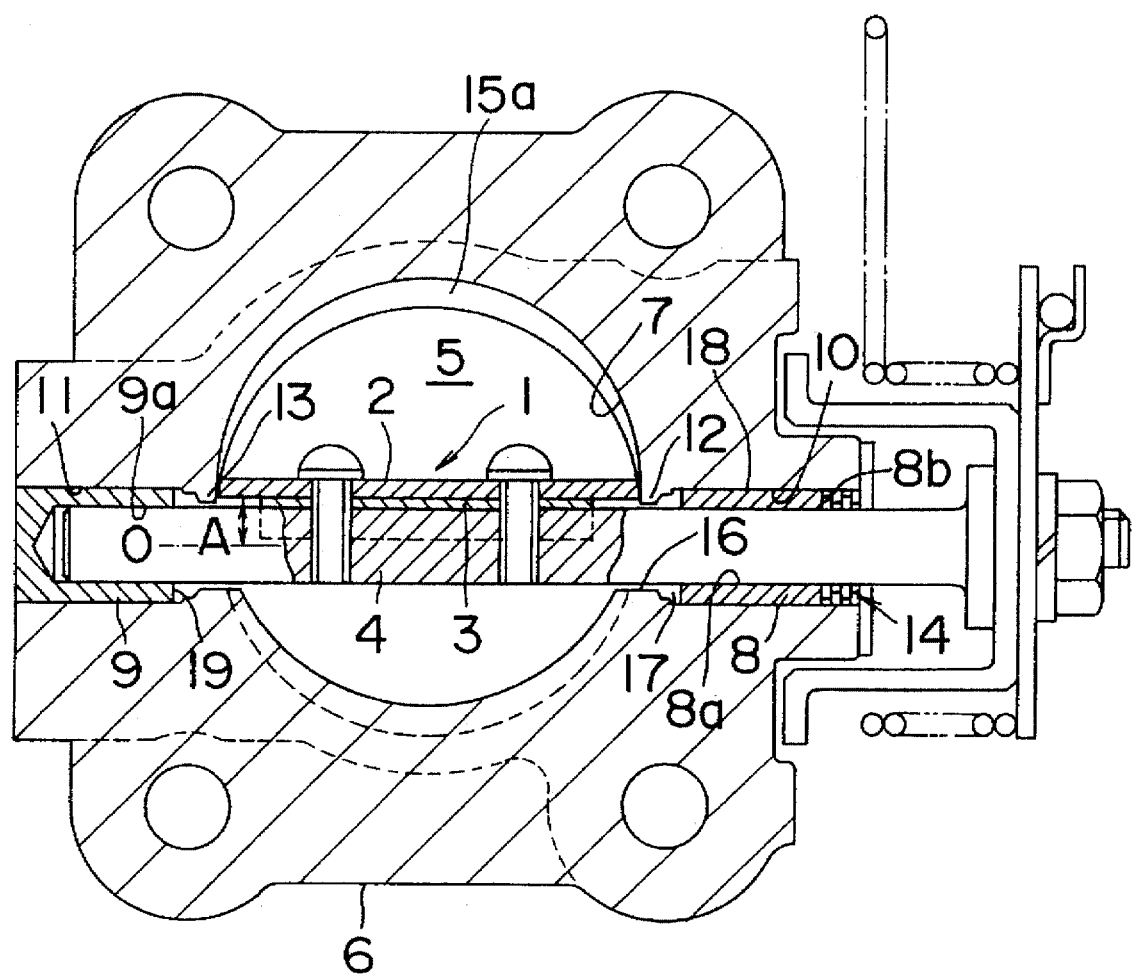
FIG. 1 is a sectional view of a butterfly valve in accordance with the present invention, which is perpendicular to the flow direction of fluid.
Figure 2:
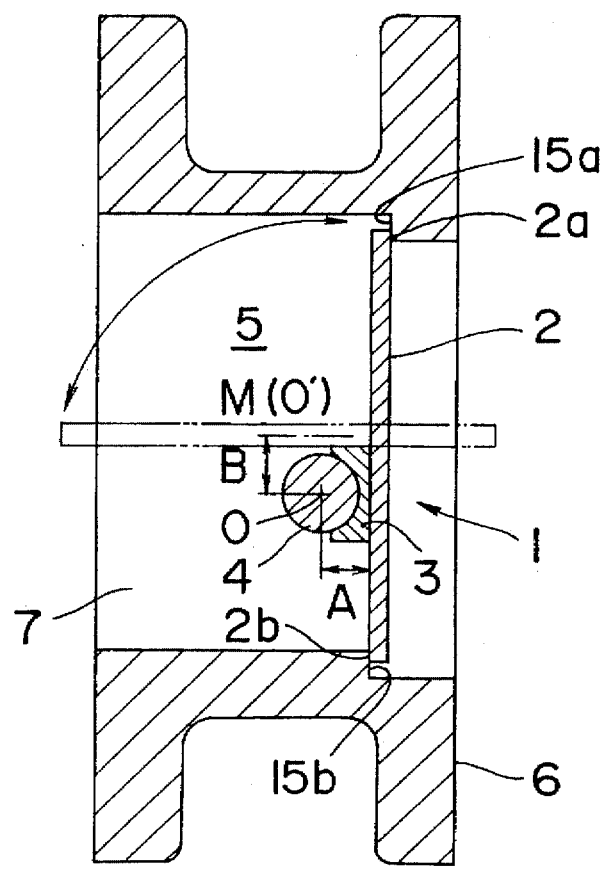
FIG. 2 is a sectional view of a butterfly valve in accordance with the present invention, which is parallel to the flow direction of fluid.

FIGS. 1 and 2 show a butterfly valve in accordance with the present invention.

A valve body 1 of this butterfly valve consists of a disc-shaped valve disc 2 fixed to a shaft 4 via a spacer 3. With this valve body 1, an axis O lies a certain distance A away from the surface of the valve disc 2. Further, the axis O lies a certain distance B away from the center M of the valve disc 2.

In a side wall 7 of a housing 6 having a fluid passage 5, holes 10 and 11 for accommodating bushes 8 and 9, respectively, are formed a distance B away from an axis O' at right angles to the flow direction of fluid. At the end on the side of the fluid passage 5 of the housing 6 having the holes 10 and 11, inward flanges 12 and 13 are formed. The inside diameters of these flanges 12 and 13 are set slightly larger than the outside diameter of the shaft 4.

The bushes 8 and 9 are pressed into the holes 10 and 11, respectively, as shown in FIG. 1. In these bushes 8 and 9, insertion holes 8a and 9a for the shaft 4 are formed, respectively. One insertion hole 8a penetrates the bushing 8, but the other insertion hole 9a does not penetrate the bushing 9. These bushes 8 and 9 are positioned with an appropriate space from the flanges 12 and 13, respectively, as shown in FIG. 1.

Figure 3:
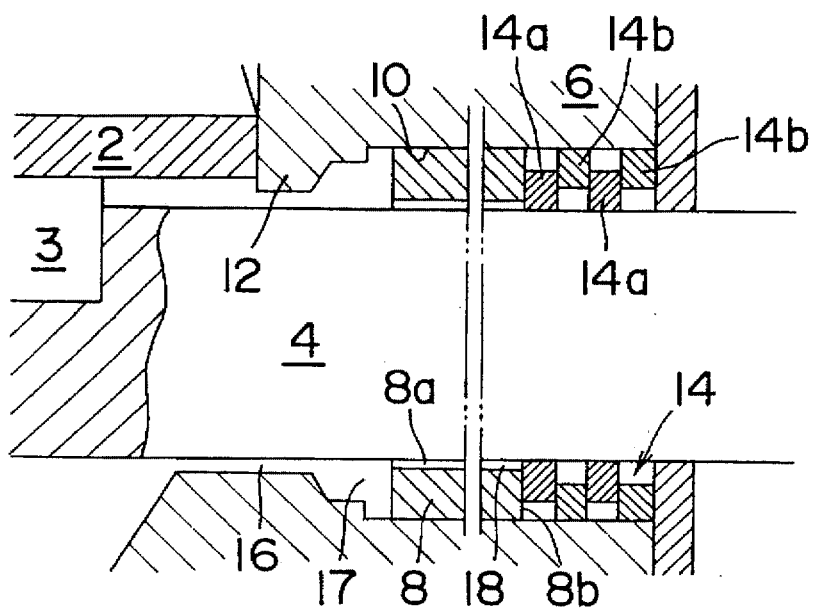
FIG. 3 is an expanded sectional view of a main part of a butterfly valve in accordance with the present invention.
Figure 4:
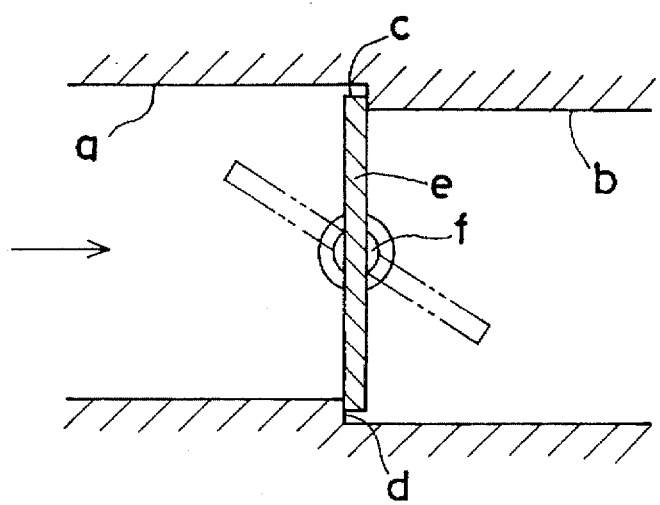
FIG. 4 is a sectional view showing a conventional butterfly valve.
Figure 5:
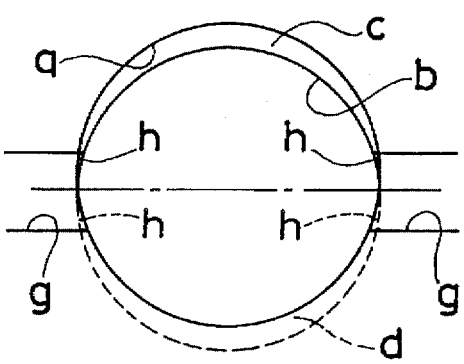
FIG. 5 is a schematic view of a fluid passage of conventional butterfly valve viewed from the upstream side.
Figure 6:
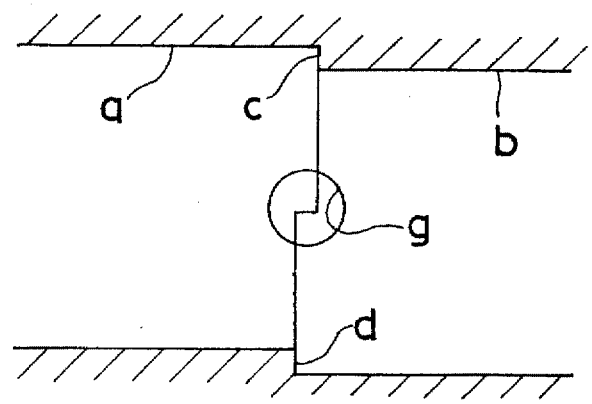
FIG. 6 is a longitudinal sectional view of a fluid passage of conventional butterfly valve.

In the holes 8a and 9a in the bushes 8 and 9 thus disposed, the shaft 4 of the valve body 1 is inserted. At the outer end 8b of one bushing 8, a plurality of ring-shaped seal plates 14a and 14b are disposed as shown in the expanded view of FIG. 3. These seal plates 14a and 14b are arranged adjacently. The inside peripheral surface of the seal plate 14a fits onto the shaft 4, while the outside peripheral surface of the seal plate 14b fits into the hole 10 in the housing 6, by which what we call a labyrinth seal 14 is configured.

In this butterfly valve, step surfaces 15a and 15b which face to the direction opposite to each other are formed at the substantially upper half portion and the substantially lower half portion of the fluid passage 5. These step surfaces 15a and 15b are offset from each other substantially by the thickness of the valve disc 2. The shaft 4 is disposed at an appropriate position (in this embodiment, the position lies a distance A away from the valve disc 2 in the downstream direction) so that the peripheral end surfaces 2a and 2b of the valve disc 2 come in contact with the step surfaces 15a and 15b in such a manner as indicated by the solid line in FIG. 2.

Therefore, in the closed condition of the butterfly valve of this embodiment, the peripheral end surfaces 2a and 2b of the valve disc 2 come in surface contact with the step surfaces 15a and 15b in such a manner as indicated by the solid line in FIG. 2, thereby the fluid passage 5 being blocked. At this time, the fluid pressure acting on a bearing portion supporting the shaft 4 is low because the hole 10 for the bearing portion is located in the downstream position of the valve disc 2.

The fluid flowing from the bearing portion to the outside passes through a first orifice 16 formed between the flange 12 and the shaft 4, and reaches an expansion chamber 17 defined between the flange 12 and the bush 8. Then, the fluid, going out of the expansion chamber 17, passes through a second orifice 18 formed between the hole 8a in the bushing 8 and the shaft 4, and exits to the outside after passing through the labyrinth seal 14.

Therefore, the fluid is subjected to friction loss at the first orifice 16, sudden expansion loss and sudden contraction loss at the expansion chamber 17, friction loss at the second orifice 18, and friction loss at the labyrinth seal 14.

In the above-described embodiment, the flange 13 is formed in the hole 11 at the other end of the shaft 4, and the bushing 9 is arranged with a space from the flange 13, so that an expansion chamber 19 is formed between the flange 13 and the bushing 9. However, the other end of the shaft 4 does not penetrate the bushing 9. Therefore, the exhaust gas scarcely leaks at the other end of the shaft 4, so that there is no need for applying the present invention.

As described above, in the butterfly valve in accordance with the present invention, sealing is surely provided by the surface contact of valve disc with the step surfaces formed over the whole circumference, by which the high-pressure exhaust gas on the upstream side is surely shut off. Further, when the valve is closed, the high-pressure exhaust gas does not act on the bearing portion because the bearing portion is located at the position on the downstream side of the valve disc. Therefore, the leakage of exhaust gas from the bearing portion can be effectually prevented.

Further, the fluid in the fluid passage leaks to the outside through the first orifice formed between the flange and the shaft, the expansion chamber, and the second orifice formed between the bush and the shaft in the fluid leakage passage of the bearing portion. Therefore, in this butterfly valve, the fluid, when leaking to the outside, is subjected to friction loss at the first orifice, sudden expansion loss and sudden contraction loss at the expansion chamber, and friction loss at the second orifice, by which the amount of fluid leaking to the outside through the bearing portion can be reduced significantly.

I claim:

1. A butterfly valve for controlling fluid flow, having upstream and downstream sides formed by being offset vertically, with respect to the fluid flow, said butterfly valve comprising:

a valve body including a valve shaft, a valve disc, and a housing, said housing including a fluid passage, a sidewall and holes formed in said sidewall, said fluid passage including substantially semicircular portions;

a pair of generally cylindrical bushings fitting into said holes respectively, said valve shaft fitting into said bushings to support said valve disc;

a first stair-step surface upstream with respect to the valve disc, said first stair-step surface formed at one of said substantially semicircular portions of said fluid passage;

a second stair-step surface downstream with respect to the valve disc, said second stair-step surface formed at the other of said substantially semicircular portions of said fluid passage;

said valve disc having peripheral end surfaces so arranged as to contact said first and second stair-step surfaces and said shaft being offset to the downstream side of said disc, one end of said shaft extending through said housing;

an inward flange formed in said housing and extending close to said shaft where said shaft extends through said housing, so as to define a first orifice between said flange and said shaft;

one of said bushings being located about said shaft, spaced outwardly from said first orifice, and defining an expansion chamber along said shaft between said first orifice and said bushing;

a second orifice formed between said shaft and said bushing spaced outwardly from said first orifice; and a labyrinth seal disposed along said shaft outwardly of said second orifice.

* * * * *